(12) United States Patent
Arellano Aguilar et al.

(10) Patent No.: US 11,623,852 B2
(45) Date of Patent: Apr. 11, 2023

(54) VEHICLE WEDGE ASSEMBLIES WITH INTEGRATED BOTTLE OPENER FEATURES

(71) Applicant: FORD GLOBAL TECHNOLOGIES, LLC, Dearborn, MI (US)

(72) Inventors: Eric Bryan Arellano Aguilar, Azcapotzalco (MX); Tomas Garciajaime, Metepec (MX); Francisco Mauricio Munoz Armenta, Lerma (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 331 days.

(21) Appl. No.: 17/011,478

(22) Filed: Sep. 3, 2020

(65) Prior Publication Data

US 2022/0063978 A1    Mar. 3, 2022

(51) Int. Cl.
| | | |
|---|---|---|
| *B67B 7/16* | (2006.01) | |
| *B67B 7/44* | (2006.01) | |
| *B67B 7/18* | (2006.01) | |
| *B67B 7/40* | (2006.01) | |

(52) U.S. Cl.
CPC ............. *B67B 7/16* (2013.01); *B67B 7/44* (2013.01); *B65D 2501/24917* (2013.01); *B67B 7/18* (2013.01); *B67B 7/403* (2013.01); *B67B 2007/166* (2013.01)

(58) Field of Classification Search
CPC .... B60R 7/00; B60R 7/02; B67B 7/16; B67B 7/44; B67B 7/18; B67B 7/403; B67B 2007/166; B65D 2501/24917; B60P 7/08; B60P 7/0807; E05B 85/02; E05B 83/00; B62D 33/037
See application file for complete search history.

(56) References Cited

U.S. PATENT DOCUMENTS

| | | | |
|---|---|---|---|
| D625,163 S * | 10/2010 | Moman | D8/38 |
| 10,160,396 B2 | 12/2018 | Stojkovic et al. | |
| 11,097,646 B2 * | 8/2021 | Dietrich | B60P 7/0807 |
| 2020/0047681 A1 | 2/2020 | Westcott | |

FOREIGN PATENT DOCUMENTS

GB     2473489 A    3/2011

OTHER PUBLICATIONS

Amazon: Hooke Road Bottle Opener Rear License Plate Tailgate Accessory for 2007-2018 Jeep JK Wrangler & Unlimited Sport Sahara Rubicon.

* cited by examiner

*Primary Examiner* — David B. Thomas
(74) *Attorney, Agent, or Firm* — Vichit Chea; Carlson, Gaskey & Olds, P.C.

(57) ABSTRACT

This disclosure details vehicle closure member wedge assemblies that include integrated bottle opener features. An exemplary vehicle closure member wedge assembly may include first and second wedge members that are configured to align a closure member relative to a vehicle body during closure member swing. A bottle opener may be integrated into one of the wedge members, thereby adding functionality to the wedge assembly. The bottle opener is conveniently packaged on the vehicle for use during outdoor social gatherings.

20 Claims, 6 Drawing Sheets

VEHICLE WEDGE ASSEMBLIES WITH INTEGRATED BOTTLE OPENER FEATURES

TECHNICAL FIELD

This disclosure relates to closure member wedge assemblies for vehicles, and more particularly to wedge assemblies that include integrated bottle opener features.

BACKGROUND

Vehicles can be utilized as social gathering spots during outdoor activities, such as camping and tailgating activities. Vehicle users typically must remember to carry various tools and convenience items, such as bottle openers, on the vehicle for facilitating a more enjoyable experience during the outdoor social activities.

SUMMARY

A wedge assembly for a vehicle closure member according to an exemplary aspect of the present disclosure includes, among other things a wedge member and a bottle opener integrated into the wedge member.

In a further non-limiting embodiment of the foregoing wedge assembly, the wedge member is a vehicle body-side wedge member.

In a further non-limiting embodiment of either of the foregoing wedge assemblies, the wedge member includes a block shaped body, at least one mounting flange, and the bottle opener.

In a further non-limiting embodiment of any of the foregoing wedge assemblies, the block shaped body, the at least one mounting structure, and the bottle opener establish a unitary, single-piece structure of the wedge member.

In a further non-limiting embodiment of any of the foregoing wedge assemblies, the wedge member is made of a hard plastic material. A second wedge member of the wedge assembly is made of a soft plastic material and is configured to interface with the wedge member.

In a further non-limiting embodiment of any of the foregoing wedge assemblies, the hard plastic material includes a thermoplastic olefin (TPO) material and the soft plastic material includes a rubber material.

In a further non-limiting embodiment of any of the foregoing wedge assemblies, the bottle opener includes a body and a metallic insert held within the body.

In a further non-limiting embodiment of any of the foregoing wedge assemblies, the metallic insert includes an opening having a lower edge configured for applying an opening force for removing a bottle cap from a bottle.

In a further non-limiting embodiment of any of the foregoing wedge assemblies, the metallic inset includes an opening and a tab that extends inward from the opening.

In a further non-limiting embodiment of any of the foregoing wedge assemblies, the tab extends at an angle relative to an inner surface of the metallic insert.

In a further non-limiting embodiment of any of the foregoing wedge assemblies, the angle is between about 25 degrees and about 90 degrees.

In a further non-limiting embodiment of any of the foregoing wedge assemblies, the angle is between about 30 degrees and about 40 degrees.

In a further non-limiting embodiment of any of the foregoing wedge assemblies, the angle is about 35 degrees.

A vehicle according to an exemplary aspect of the present disclosure includes, among other things, a vehicle body, a closure member movably mounted to the vehicle body, and a wedge assembly configured to align the closure member relative to the vehicle body during movement of the closure member. The wedge assembly includes an integrated bottle opener.

In a further non-limiting embodiment of the foregoing vehicle, the closure member is a liftgate pivotably connected to the vehicle body.

In a further non-limiting embodiment of either of the foregoing vehicles, the wedge assembly includes a first wedge member mounted to the vehicle body and a second wedge member mounted to the closure member. The integrated bottle opener is part of either the first wedge member or the second wedge member.

In a further non-limiting embodiment of any of the foregoing vehicles, the first wedge member or the second wedge member includes a wedge bumper that interfaces with a wedge interface pad of the other of the first wedge member or the second wedge member.

In a further non-limiting embodiment of any of the foregoing vehicles, the integrated bottle opener includes a body and a metallic insert held within the body.

In a further non-limiting embodiment of any of the foregoing vehicles, the metallic insert includes an opening having a lower edge configured for applying an opening force for removing a bottle cap from a bottle.

In a further non-limiting embodiment of any of the foregoing vehicles, the metallic inset includes an opening and a tab that extends at an angle relative to the opening.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

Figure 1:
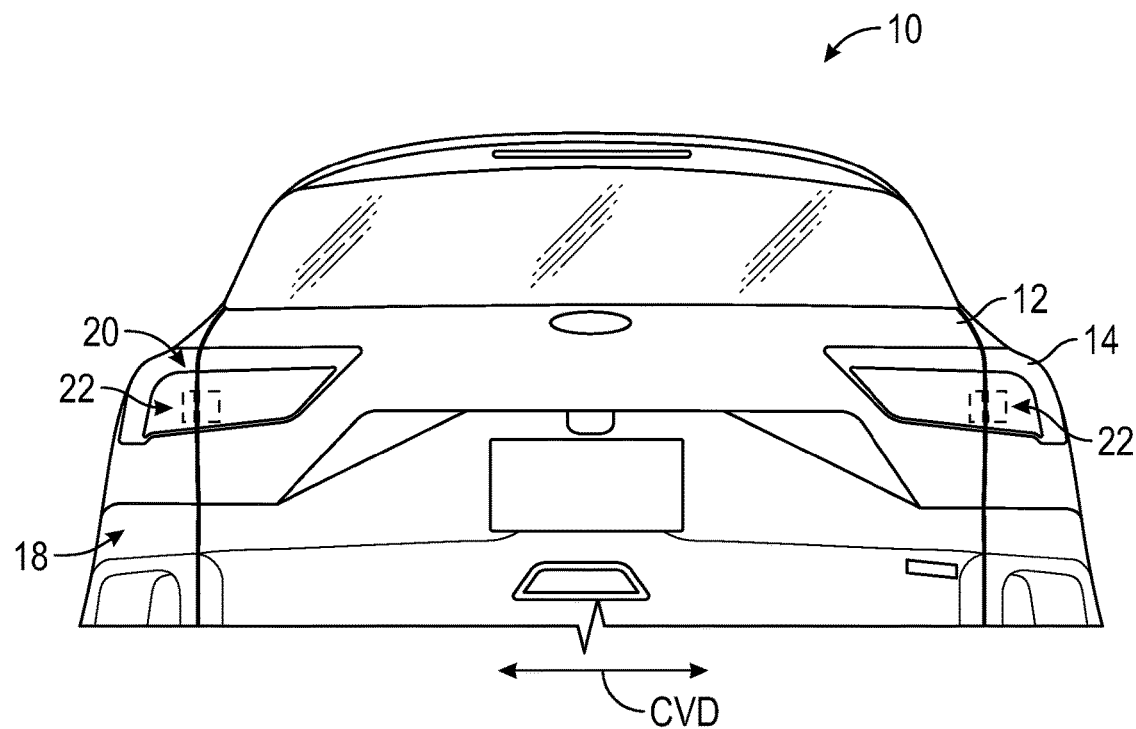
FIG. 1 is a rear view of a motor vehicle equipped with a closure member.
Figure 2:
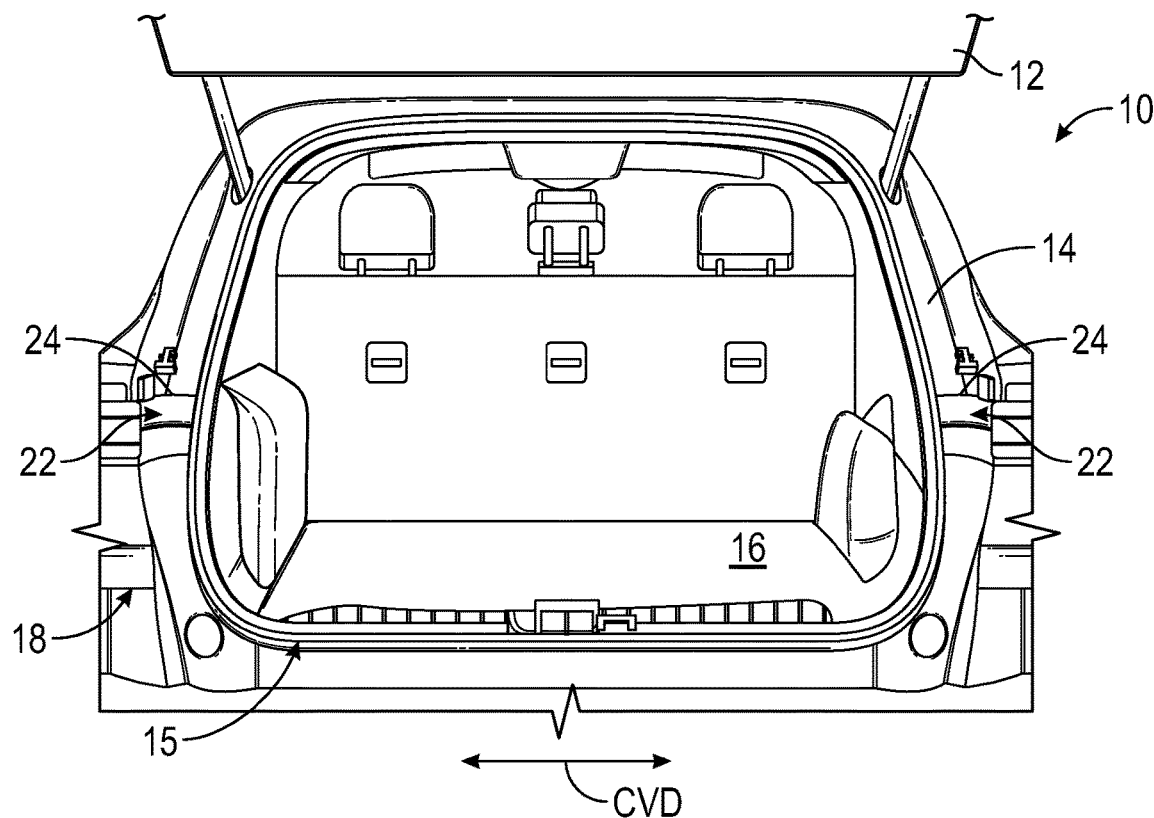
FIG. 2 illustrates the vehicle of FIG. 1 with the closure member in an open position.
Figure 3:
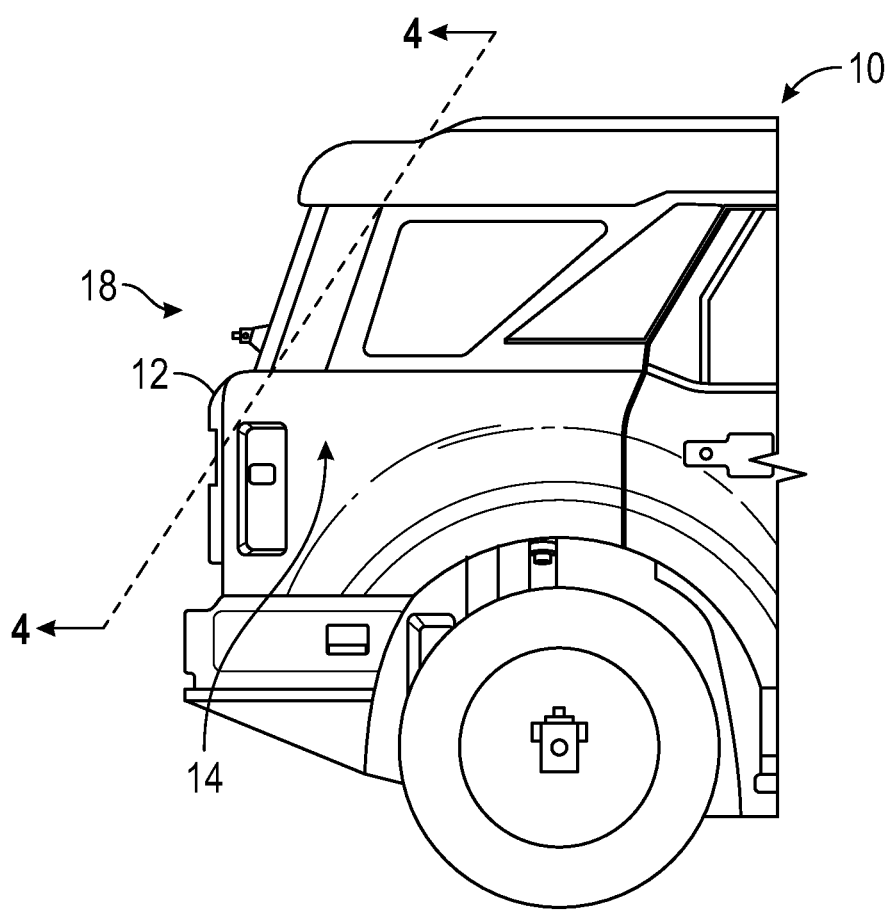
FIG. 3 is a side view of a rear portion of the vehicle of FIG. 1.

This disclosure details vehicle closure member wedge assemblies that include integrated bottle opener features. An exemplary vehicle closure member wedge assembly may include first and second wedge members that are configured to align a closure member relative to a vehicle body during closure member swing. A bottle opener may be integrated into one of the wedge members, thereby adding functionality to the wedge assembly. The bottle opener is conveniently packaged on the vehicle for use during outdoor social gatherings. These and other features of this disclosure are described in greater detail below.

FIGS. 1-4 illustrate select portions of a motor vehicle 10. The vehicle 10 may be a car, a truck, a van, a sport utility vehicle (SUV), or any other type of vehicle. The vehicle 10 could also be a conventional motor vehicle, a battery powered hybrid or electric vehicle, or an autonomous vehicle (i.e., a driverless vehicle).

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

The vehicle 10 includes a closure member 12 movably (e.g., pivotably) mounted to a vehicle body 14 in order to expose and close an opening 15 (see FIG. 2) of the vehicle body 14. For example, the closure member 12 could be pivotally mounted to the vehicle body 14 for allowing users to load items into or unload items from a cargo space 16 of the vehicle 10 via the opening 15. The opening 15 and the cargo space 16 may be located at a rear 18 of the vehicle 10.

In an embodiment, the closure member 12 is a liftgate. However, other vehicle closure members, including but not limited to swing gates, hatchback doors, side doors, hoods, decklids, etc., could also benefit from the teachings of this disclosure.

The vehicle 10 is additionally equipped with a wedge system 20 for stabilizing and aligning the closure member 12 relative to the vehicle body 14 during closure member 12 swing. For example, the wedge system 20 may stabilize and align the closure member 12 in a cross-vehicle direction CVD in order to enable the closure member 12 to properly latch to the vehicle body 14 when moving between the open position of FIG. 2 and the closed position of FIG. 1.

The wedge system 20 may include a pair of wedge assemblies 22. In an embodiment, one wedge assembly 22 is positioned at each opposing side of the opening 15 near an interface between the closure member 12 and the vehicle body 14. Although two wedge assemblies 22 are schematically illustrated in FIG. 1, the wedge system 20 could include one or more wedge assemblies within the scope of this disclosure. Moreover, the specific mounting location of the wedge assemblies 22 may vary within the scope of this disclosure.

Each wedge assembly 22 may include a first wedge member 24 mounted to the vehicle body 14 and a second wedge member 26 mounted to the closure member 12. The first wedge member 24 and the second wedge member 26 may be mounted to the vehicle body 14 and the closure member 12, respectively, via one or more fasteners 32 (e.g., screws, bolts, etc.). In an embodiment, the first wedge member 24 includes a wedge interface pad 28 and the second wedge member 26 includes a wedge bumper 30 configured to align with and contact the wedge interface pad 28 during closing of the closure member 12 (best shown in FIG. 4). However, an opposite configuration is also contemplated within the scope of this disclosure in which the first wedge member 24 includes the wedge bumper and the second wedge member 26 includes the wedge interface pad.

The first and second wedge members 24, 26 of each wedge assembly 22 may function in conjunction with one another to stabilize the closure member 12 relative to the vehicle body 14 during the swing of the closure member 12. Moreover, as discussed in greater detail below, additional functionality (e.g., a bottle opener feature) can be integrated into one or both of the wedge assemblies 22 in order to facilitate a more enjoyable user experience when using the vehicle 10 as a social gathering spot during outdoor activities (e.g., camping, tailgating, etc.).

Referring now to FIGS. 4-7, the first wedge member 24 of each wedge assembly 22 may include a block shaped body 34, one or more mounting flanges 36, and an integrated bottle opener 38. Together, the bock shaped body 34, the mounting flanges 36, and the bottle opener 38 establish an integrated, single-piece structure of the first wedge member 24.

The block shaped body 34 may be generally rectangular shaped and may include an outer surface that establishes the wedge interface pad 28 for interfacing with the wedge bumper 30 of the second wedge member 26. In the mounted position of the first wedge member 24 shown in FIG. 4, the wedge interface pad 28 of the block shaped body 34 is substantially flat, faces toward an opposite wedge member 22 of the vehicle 10, and extends about parallel to a vertical or Z-axis of the vehicle 10. In this disclosure, the term "about" means that the expressed quantities or ranges need not be exact but may be approximated and/or larger or smaller, reflecting acceptable tolerances, conversion factors, measurement error, etc.

Each mounting flange 36 may extend transversely away from the block shaped body 34 and includes at least one opening 40. Each opening 40 is configured to receive one of the fasteners 32 for mounting the first wedge member 24 to the vehicle body 14.

A body 42 of the bottle opener 38 may extend transversely away from the block shaped body 34. In an embodiment, the body 42 protrudes at an angle from a lower section 44 of the block shaped body 34, and one of the mounting flanges 36 protrudes at an angle from an upper section 46 of the block shaped body 34. Therefore, the bottle opener 38 may be disposed on an opposite side of the block shaped body 34 from at least one of the mounting flanges 36.

A metallic insert 48 may be imbedded or otherwise held in place within an opening 50 formed in the body 42 of the bottle opener 38. In an embodiment, a peripheral edge 51 of the metallic insert 48 is received within an internal groove 52 of the body 42 to connect the metallic insert 48 to the body 42 (see FIG. 7). The internal groove 52 may circumscribe the opening 50 of the body 42.

An opening 54 may be formed through the metallic insert 48 of the bottle opener 38. Alternatively, the opening 54 could be formed in a portion of the body 42 in embodiments that exclude the metallic insert 48. The opening 54 may, in an exemplary embodiment, be trapezoidal in shape and include four curved corners 56 (see FIG. 6). A lower edge 58 of the opening 54 may be configured for applying an opening force for removing a bottle cap from a bottle.

A tab 60 of the metallic insert 48 may extend inwardly of the opening 54. The tab 60 may be configured to control the amount of swing necessary to remove a bottle cap from a bottle via the lower edge 58. The tab 60 therefore provides a mistake-proof or "poka-yoke" feature of the bottle opener 38.

Figure 7:
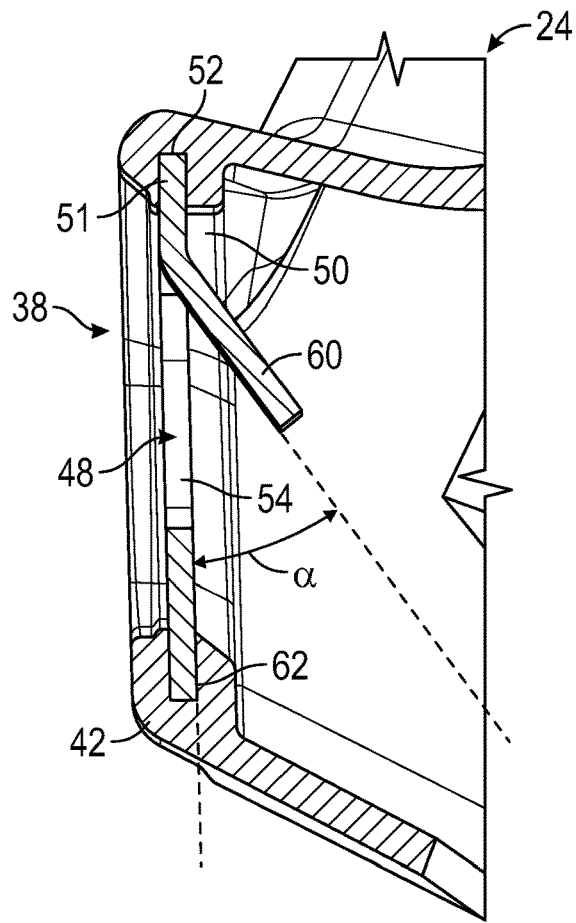
FIG. 7 is a cross-sectional view through section 7-7 of FIG. 5.

As shown in FIG. 7, the tab 60 may extend at an angle α relative to an inner surface 62 of the metallic insert 48 through which the opening 54 is formed. The angle α can be an important design feature for properly aligning a bottle relative to the bottle opener 38 at an angle that maintains clearances between the bottle and other vehicle components, such as a taillamp housing 64 (see FIG. 4) or other portions of the vehicle body 14 that surround the opening 15. In an embodiment, the angle α is between about 25 degrees and about 90 degrees. In another embodiment, the angle α is between about 30 degrees and about 40 degrees. In yet another embodiment, the angle α is about 35 degrees.

The first wedge member 24 (excluding the metallic insert 48) may be made of a relatively hard plastic material. In an embodiment, the first wedge member 24 is made of a thermoplastic olefin (TPO) material. However, other hard plastic materials could alternatively be utilized to construct the first wedge member 24.

Figure 4:
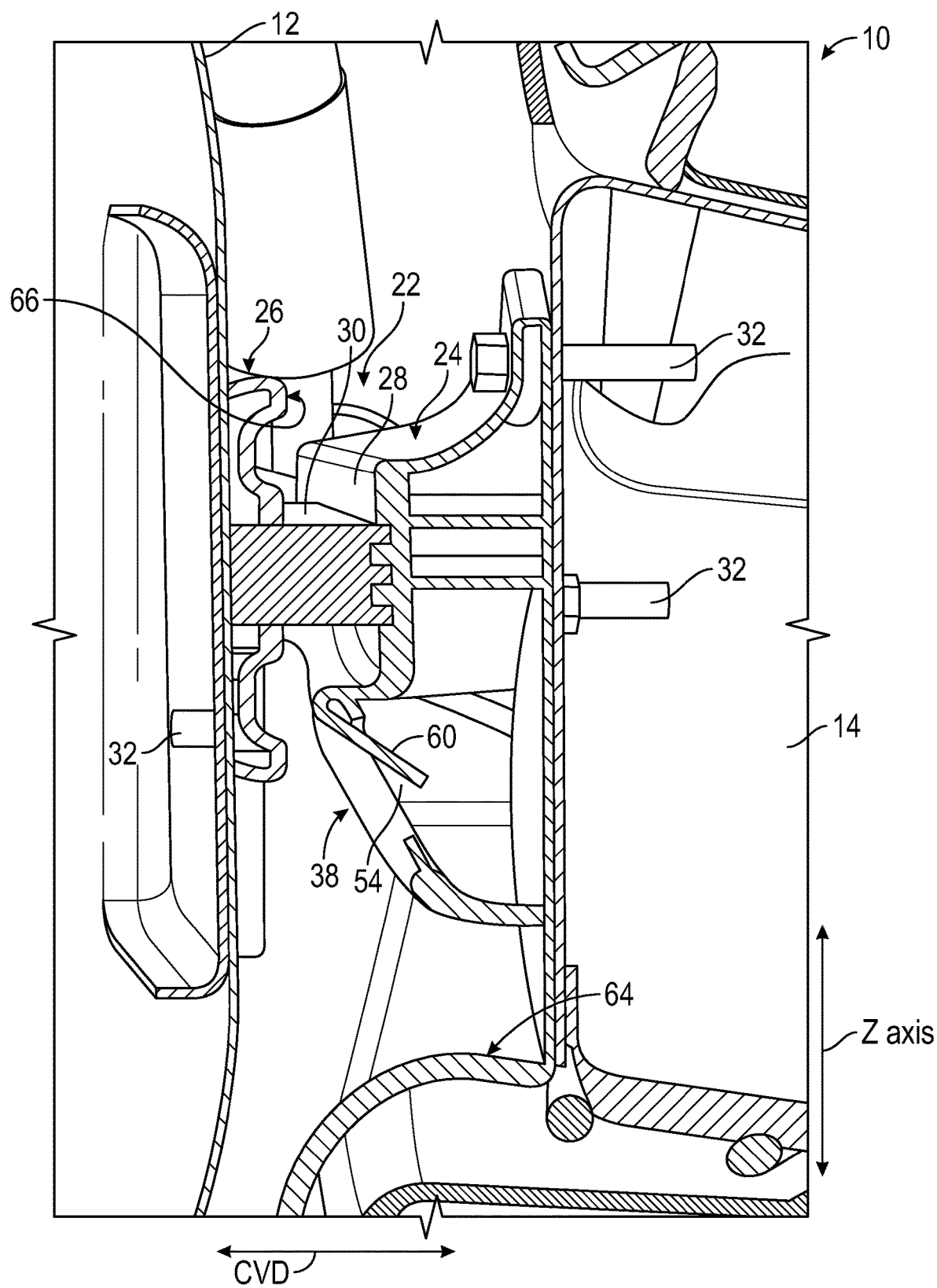
FIG. 4 is a cross-sectional view through section 4-4 of FIG. 3.
Figure 5:
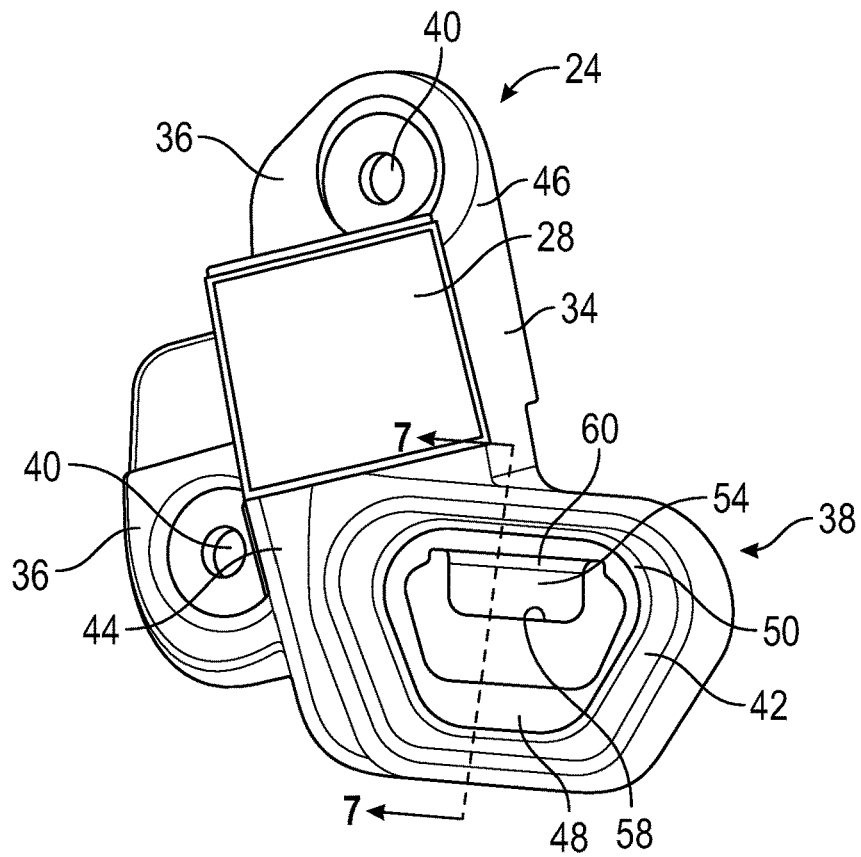
FIG. 5 illustrates a body-side wedge member of a vehicle closure member wedge assembly.
Figure 6:
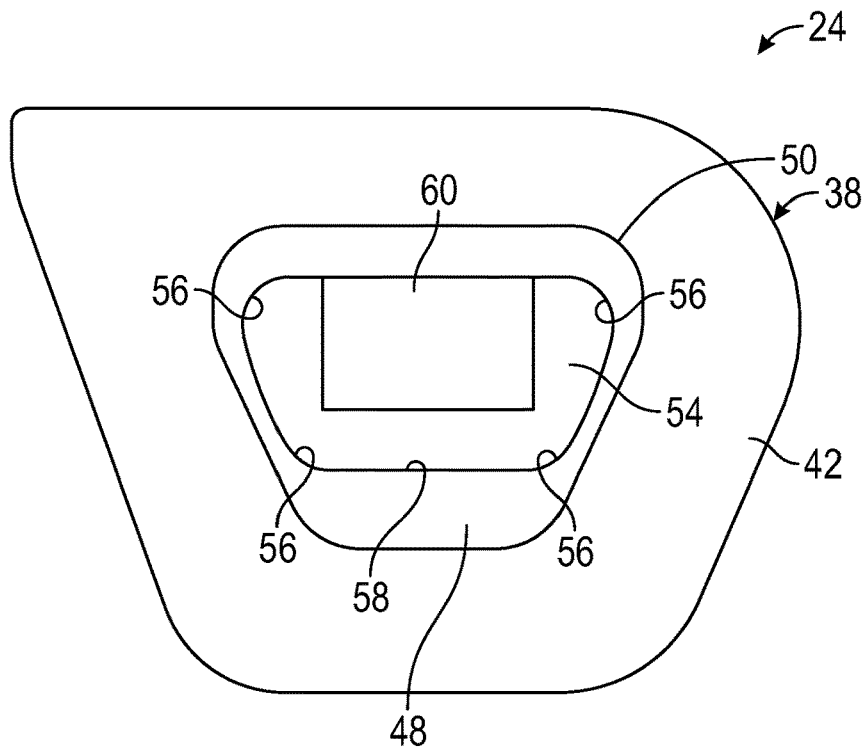
FIG. 6 illustrates features of an integrated bottle opener of the body-side wedge member of FIG. 5.
Figure 8:
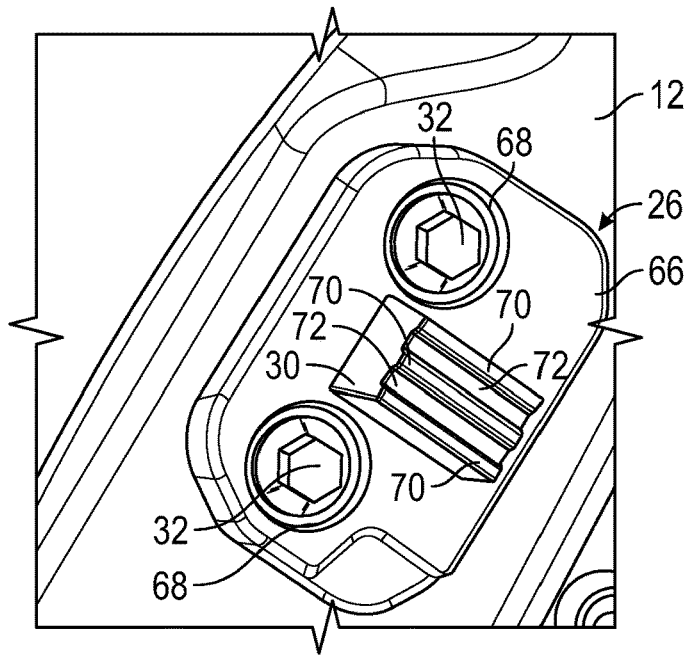
FIG. 8 illustrates a door-side wedge member of a vehicle closure member wedge assembly.

The second wedge member 26 of each wedge assembly 22 is further illustrated in FIGS. 4 and 8. The second wedge member 26 may include a base 66 and the wedge bumper 30. The wedge bumper 30 may protrude outwardly from the base 66 and is configured to interface with the wedge interface pad 28 of the first wedge member 24. The wedge bumper 30 may include a combination of ridges 70 and channels 72 that are configured to improve the point-to-point contact between the wedge bumper 30 and the wedge interface pad 28.

One or more fastener openings 68 may be formed through the base 66. The fastener openings 68 are each sized to receive one of the fasteners 32 for mounting the second wedge member 26 to the closure member 12. The total number of fastener openings 68 and fasteners 32 employed for mounting the second wedge member 26 to the closure member 12 is not intended to limit this disclosure.

The second wedge member 26 may be made of a relatively soft plastic material. In an embodiment, the second wedge member 26 is made of rubber. However, other soft plastic materials could alternatively be utilized to construct the second wedge member 26.

Figure 9:
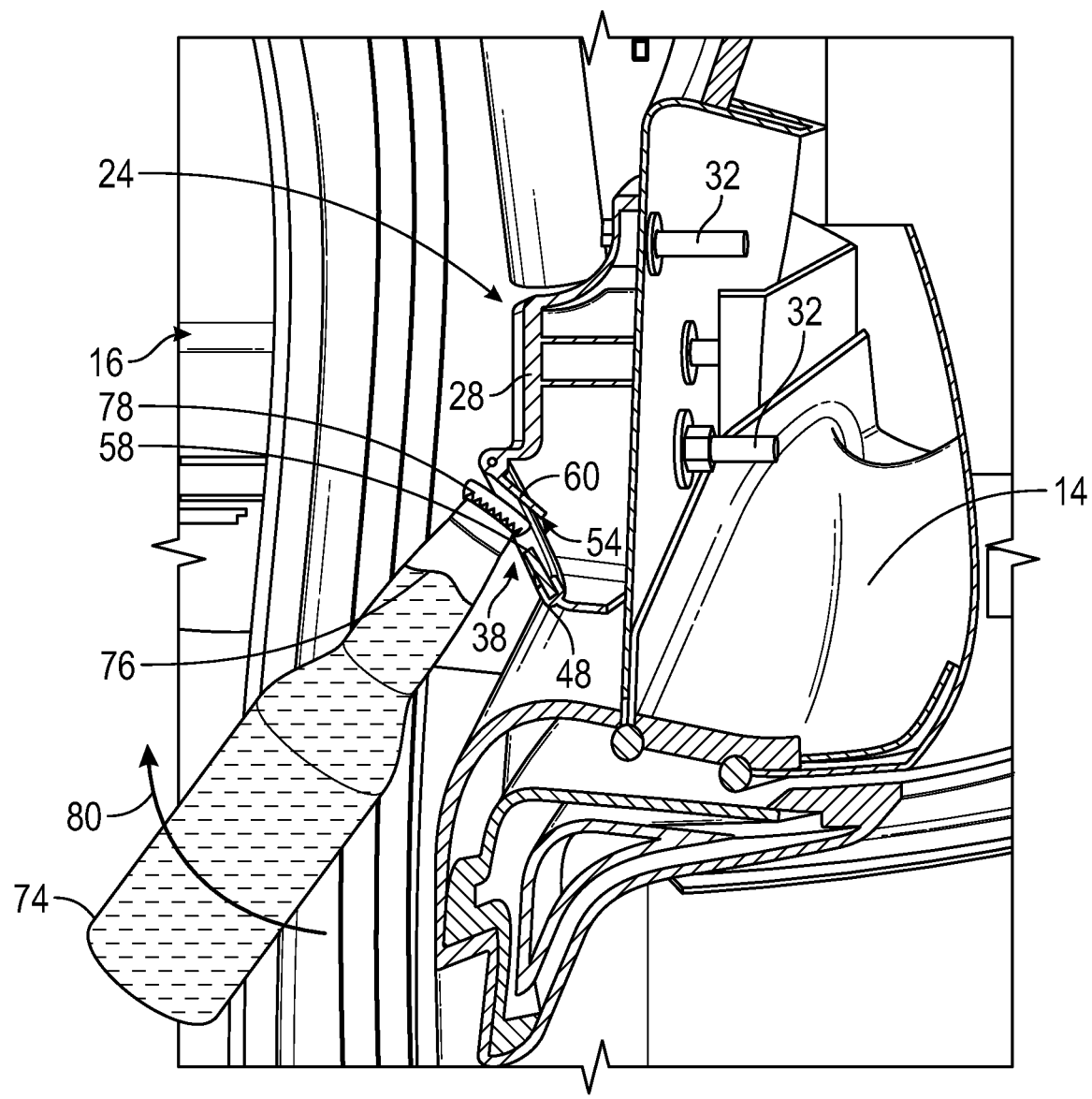
FIG. 9 schematically illustrates an exemplary use of an integrated bottle opener of a vehicle wedge assembly for opening a bottle containing a beverage.

FIG. 9, with continued reference to FIGS. 1-8, schematically illustrates the use of the integrated bottle opener 38 of a wedge member 24 of a wedge assembly 22 of the vehicle 10 for opening a bottle 74 that contains a beverage 76. Prior to opening, the beverage 76 is contained within the bottle 74 by a bottle cap 78. The bottle opener 38 may be used to remove the bottle cap 78 without spilling the beverage 76.

The bottle opener 38 is accessible by users when the closure member 12 is opened and is therefore conveniently packaged near the cargo space 16 as part of the wedge assembly 22. The bottle opener 38 may be used during outdoor social gathering and avoids the need for the user to remember to carry a separate bottle opener.

The bottle cap 78 may be removed from the bottle 74 via the bottle opener 38 in the following exemplary manner A user may first position the bottle 74 so the bottle cap 78 is at least partially received within the opening 54 of the metallic insert 48 of the bottle opener 38. The positioning of the tab 60 relative to the opening 54 forces the user to position the bottle 74 at a specific angle relative to the bottle opener 38. In particular, the tab 60 positions the bottle 74 such that an upward swing path (shown schematically via arrow 80) is required to remove the bottle cap 78 from the bottle 74. The user is thus not permitted to position the bottle 74 at a downward angle relative to the bottle opener 38, thereby avoiding spills. The configuration of the opening 54 and the tab 60 therefore provides the mistake-proof features of the bottle opener 38.

As the user moves the bottle 74 along the upward swing path 80, the bottle cap 78 is moved into engagement with the lower edge 58 of the opening 54, thereby applying an opening force for removing the bottle cap 78 from the bottle 74. The tab 60 may support and stabilize the bottle 74 during its movement along the upward swing path 80.

The vehicle wedge assemblies of this disclosure include integrated bottle openers that are packaged within a wedge member of the assembly, thereby adding additional functionality to the vehicle closure member wedge system. The bottle openers are conveniently located near the cargo space of the vehicle and are accessible when the closure member is open to facilitate a more enjoyable usage and experience during outdoor social gatherings. The integrated bottle openers of this disclosure include mistake-proof features for ensuring that users position bottles at a specific angle and direction relative to the bottle opener to prevent beverage spillage.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A wedge assembly for a vehicle closure member, comprising:
   a wedge member including a block shaped body; and
   a bottle opener integrated into the wedge member.

2. The wedge assembly as recited in claim 1, wherein the wedge member is made of a hard plastic material, and comprising a second wedge member that is made of a soft plastic material and is configured to interface with the wedge member.

3. The wedge assembly as recited in claim 2, wherein the hard plastic material includes a thermoplastic olefin (TPO) material and the soft plastic material includes a rubber material.

4. The wedge assembly as recited in claim 1, wherein the bottle opener includes a body and a metallic insert held within the body.

5. The wedge assembly as recited in claim 4, wherein the metallic insert includes an opening having a lower edge configured for applying an opening force for removing a bottle cap from a bottle.

6. The wedge assembly as recited in claim 4, wherein the metallic inset includes an opening and a tab that extends inward from the opening.

7. The wedge assembly as recited in claim 6, wherein the tab extends at an angle relative to an inner surface of the metallic insert.

8. The wedge assembly as recited in claim 7, wherein the angle is between about 25 degrees and about 90 degrees.

9. The wedge assembly as recited in claim 7, wherein the angle is between about 30 degrees and about 40 degrees.

10. The wedge assembly as recited in claim 7, wherein the angle is about 35 degrees.

11. A wedge assembly for a vehicle closure member comprising:
   a wedge member; and
   a bottle opener integrated into the wedge member,
   wherein the wedge member is a vehicle body-side wedge member.

12. The wedge assembly as recited in claim 11, wherein the wedge member includes a block shaped body, at least one mounting flange, and the bottle opener.

13. The wedge assembly as recited in claim 12, wherein the block shaped body, the at least one mounting structure, and the bottle opener establish a unitary, single-piece structure of the wedge member.

14. A vehicle, comprising:
   a vehicle body;
   a closure member movably mounted to the vehicle body; and
   a wedge assembly configured to align the closure member relative to the vehicle body during movement of the closure member,
   wherein the wedge assembly includes an integrated bottle opener.

15. The vehicle as recited in claim 14, wherein the closure member is a liftgate pivotably connected to the vehicle body.

16. The vehicle as recited in claim 14, wherein the wedge assembly includes a first wedge member mounted to the vehicle body and a second wedge member mounted to the closure member, and further wherein the integrated bottle opener is part of either the first wedge member or the second wedge member.

17. The vehicle as recited in claim 16, wherein the first wedge member or the second wedge member includes a wedge bumper that interfaces with a wedge interface pad of the other of the first wedge member or the second wedge member.

18. The vehicle as recited in claim 14, wherein the integrated bottle opener includes a body and a metallic insert held within the body.

19. The vehicle as recited in claim 18, wherein the metallic insert includes an opening having a lower edge configured for applying an opening force for removing a bottle cap from a bottle.

20. The vehicle as recited in claim 18, wherein the metallic inset includes an opening and a tab that extends at an angle relative to the opening.

* * * * *